United States Patent [19]

Wells et al.

[11] Patent Number: 4,791,712

[45] Date of Patent: Dec. 20, 1988

[54] MODULAR PISTON WITH HIGH STRENGTH TENSILE JOINT AND METHOD OF MANUFACTURE

[75] Inventors: Joel R. Wells, Huber Heights; James M. Pees, Dayton, both of Ohio

[73] Assignee: General Motors Corporation, Detroit, Mich.

[21] Appl. No.: 151,457

[22] Filed: Feb. 2, 1988

Related U.S. Application Data

[63] Continuation-in-part of Ser. No. 902,506, Sep. 2, 1986, abandoned.

[51] Int. Cl.⁴ .......................... B23P 15/10; F16J 1/12
[52] U.S. Cl. .................................. 29/156.5 R; 29/517; 72/121; 92/172; 188/322.22; 403/285
[58] Field of Search ................. 29/516, 517, 156.5 R; 72/107, 110, 121, 126; 92/172, 208; 188/322.22; 285/382.1, 382.7; 403/274, 284, 285

[56] References Cited

U.S. PATENT DOCUMENTS

| | | | |
|---|---|---|---|
| 2,157,252 | 5/1939 | Visser | 29/516 |
| 2,487,512 | 11/1949 | Berger | 29/516 |
| 2,854,744 | 10/1958 | Crockett | 403/274 |
| 2,912,069 | 11/1959 | Dillenburger | 188/322.22 |
| 3,068,563 | 12/1962 | Reverman | 29/516 |
| 3,326,006 | 6/1967 | Mount | 403/274 |
| 3,724,615 | 4/1973 | Stormer | 188/322.22 |
| 4,585,059 | 4/1986 | Lee | 285/382.1 |

FOREIGN PATENT DOCUMENTS 343967 2/1931 United Kingdom ................. 29/516

Primary Examiner—George L. Walton
Attorney, Agent, or Firm—Charles R. White

[57] ABSTRACT

A modular piston having a high tensile strength piston and rod connection produced without lubrication, weld splatter or other contaminants. The method produces an optimized joint from strength, concentricity and cleanliness standpoints. The parts are centered and connected in the same operation. With this connection an elastomeric bumper and bumper containment plate are retained in position for a complete assembly.

10 Claims, 2 Drawing Sheets

MODULAR PISTON WITH HIGH STRENGTH TENSILE JOINT AND METHOD OF MANUFACTURE

This invention is a continuation-in-part of application Ser. No. 902,506, filed Sept. 2, 1986 now abandoned.

This invention relates to piston assemblies and more particularly to a stroking piston having a new and improved high strength tensile joint concentrically and squarely coupling a piston to a piston rod and to a method of making a piston assembly with a high strength tensile joint and with optimized concentricity.

Various gas and hydraulic stroking piston and cylinder units utilize a modular shell-like piston joined to a piston rod with a high tensile strength joint. An illustrative device is shown in U.S. Pat. No. 3,724,615, issued April 3, 1973 to Joseph R. Stormer entitled SHOCK ABSORBER WITH WELDED PISTON ROD assigned to the assignee of this invention and hereby incorporated by reference. The present invention is of this general category but advantageously utilizes the matched and formed interconnection of the walls of the piston and rod to make a high strength tensile connection between these two parts. This is accomplished by a special annular rolled-in tongue and groove interconnection which does not add any mass or material to the assembly or contaminants that would detract from service life and efficiency of the unit. The joint and method employed for the interconnection provides the optimum use of material without appreciable scrap and with automatic lengthening of the piston rod from a cut length to a specified design length. Furthermore, with the joining with the piston rod with this high strength joint and manufacturing method, an automatic and precise centering and squaring of these parts is assured. The lower jounce bumper containment plate or washer is secured in fixed position on the neck of the piston and against the upper face of the piston shell by an annular retainer bulge formed when the piston neck is grooved.

After the rod and piston are assembled, a valve assembly can be installed in the shell-like piston the lower annular edge portion of the skirt of the piston can be spun over to retain the orifice plate and valving therein. The inwardly radiused outer groove of an upstanding neck of the piston provides an annular locking surface receiving an inwardly extending and annular resilient retainer ring formed on an elastomeric jounce bumper which may be employed in many installations.

In the preferred method of this invention, the piston rod is roll formed with an annular groove of constant dimension and at a precise location relative to an upper end of the piston rod and this action elongates the piston rod. After the piston rod is roll formed with this groove, a piston shell, with a jounce bumper containment washer mounted thereon, is installed in telescopic relationship on the rod. Preferably the piston in a shell having a perpendicular neck that is press-fitted to a positive stop onto the rod so that the groove is in precise but hidden location. After this has occurred, form rollers are again brought into action to form roll an annular groove into the neck of the piston to displace material radially inwardly and directly into the groove of the piston rod to make a high strength tensile joint and to trap the containment washer in position. By annular form rolling with uniform pressure and using the same form rolling machine with only the form rollers being changed for the finish roll, a new and higher standard for squareness, perpendicularity and concentricity is obtained. In the event that even higher strength joints are made more than one form-rolled groove connection can be made.

These and other features, objects and advantages of this invention will become more apparent from the following detailed description and drawing in which.

Figure 1:
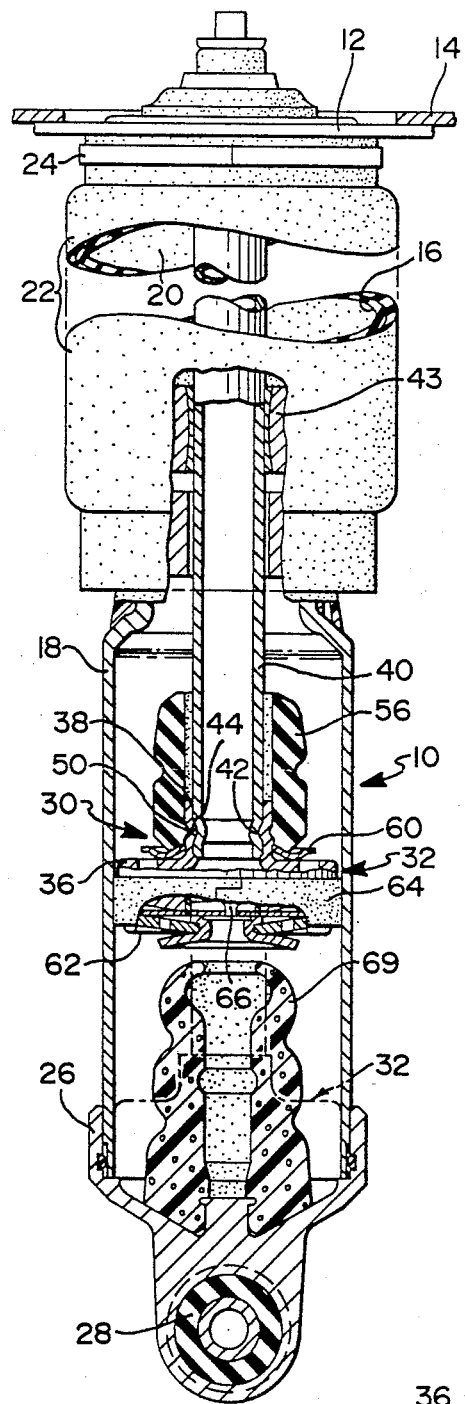
FIG. 1 is a side view partially in elevation and partially in section of an air suspension damper incorporating the high strength piston and broad assembly of this invention.

Referring now in greater detail to the drawings, FIG. 1 shows an air suspension damper 10 having a top mount 12 secured to the vehicle body 14. There is an inner air sleeve 16 secured at its upper end to the top mount and at its lower end to the top of a generally cylindrical reservoir tube 18 to define an air suspension chamber 20 for containing pressurized air for the pneumatic suspension of the vehicle. A resilient elastomer outer support sleeve 22 is connected to the top mount by a band 24 to surround and provide full time support and protection for the air sleeve 16. The reservoir tube 18 is an elongated tube fastened at its lower end in a base cup 26 that includes a lower isolation mount 28 secured to an unsprung portion of the vehicle such as the rear axle of a vehicle as described in copending application Ser. No. 896,452 entitled AIR SPRING DAMPER FOR VEHICLE SUSPENSION, filed Aug. 13, 1986, by James M. Pees and Michael McClain assigned to General Motors Corporation and hereby incorporated by reference. The air spring damper 10 further incorporates a valved piston and rod assembly 30 mounted for stroking movement in the cylindrical reservoir tube 18. The piston 32 of the piston and rod assembly 30 comprises a cylindrical metallic main shell 36, see FIG. 2, having a centralized and upstanding cylindrical neck 38. The piston and rod assembly 30 further comprises a tubular metallic piston rod 40 extending from a roll-formed high tensile strength connection 42 with the neck 38 of the piston shell 36 and axially through the reservoir tube 18 and rod guide 43 into connection with the elastomeric main body of the to mount 12. The piston rod 40 is treated with a protective coating such as Melonite so that welding of the rod to the piston will not produce the clean, precisely centered high tensile strength joint required in many installation such as the air suspension damper of FIG. 1.

More particularly, the piston rod 40 is a tubular member of a predetermined wall thickness and cut to a predetermined length, which is less than the required length of the rod. This rod is subsequently elongated to the design length, 1 mm for example, by roll forming an annular groove 44 in the wall therein adjacent to the lower end 46 and at a predetermined distance from a squared and finished upper end. The groove 44 in the piston rod provides an annular anchorage groove for the piston whose neck 38 perpendicular to the body of the shell is telescoped over the lower end portion of the piston rod. The parts are preferably fitted together until the lower end 46 to the piston rod strikes internal annular stop surface 48 within the piston shell. After these parts are precisely located, a second annular groove 50 is rolled in the outer wall of neck 38. By rolling this second groove, the inner wall 52 of the neck is radially deformed inwardly to provide an annular ridge or tongue 54 that fills the groove 44 in the piston rod to provide the annular high strength and fluid tight interlock. The piston interlock has high tensile strength to carry large magnitude rebound and jounce loads that may frequently occur as the vehicle is driven, particularly along roadways that are rough and bumpy.

Figure 2:
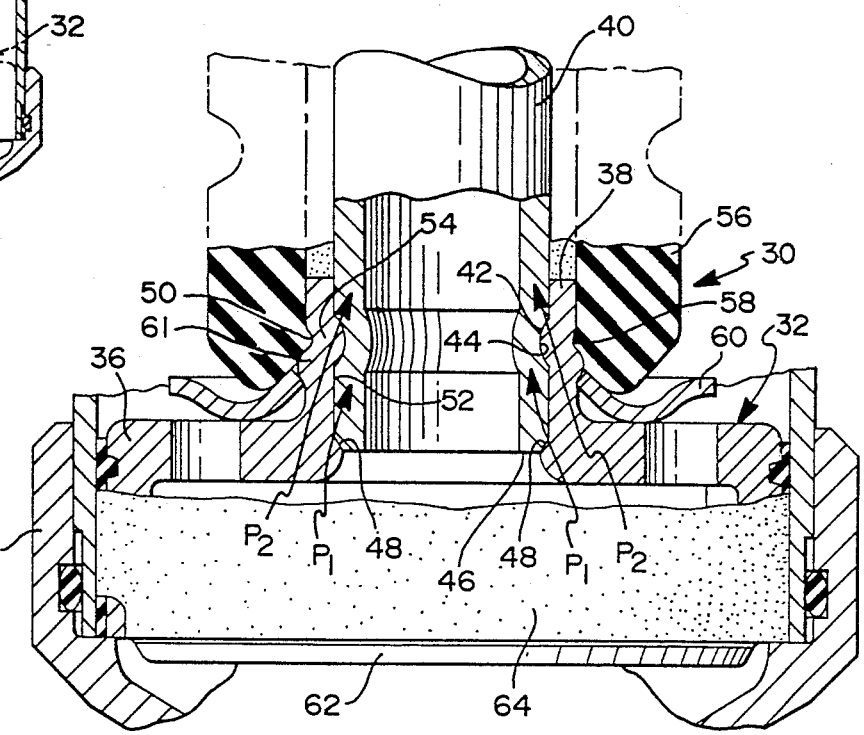
FIG. 2 is a cross-sectional view of the piston and rod assembly taken generally along lines 2—2 of FIG. 1 with parts removed.

As shown in FIG. 1 and 2, the piston carries a resilient generally cylindrical rebound bumper 56 of elastomeric material which is molded to include an annular inwardly extending bead-like member 58 which when inserted over the piston rod 40 and the neck 38 of the piston deflects or snap fit into the outer groove 50 formed in the neck 38 of the piston. With the bumper 56 retained by this resilient tongue and groove connection, the rebound bumper effectively cushions rebound loads without working loose but can be removed for replacement if rebuild of the air suspension damper is required.

In addition to the high tensile strength securement of the piston 32 to rod 40, this interlocked grooving secures and maintains the annular load spreading and bumper containment washer 60 in place below the lower end of the rebound bumper 56 and the upper surface of the main shell of the piston. More particularly and as shown, somewhat exaggerated for illustration purposes in FIGS. 2 and 6, an annular bulge or retainer collar 61 is formed when the groove 50 is rolled in the neck of the piston. This retainer collar has a diameter greater than the internal diameter of the washer 60 so that the washer is mechanically trapped and firmly secured in the FIG. 2 position. The piston contains an orifice plate and flow control valving which are retained within the piston shell by spinning the lower cylindrical flange 62 of the piston shell inwardly as disclosed in the above-referenced copending application Ser. No. 896,452. The washer 60 prevents the material of the rebound bumper 56 from blocking the piston valving when the bumper 56 is deflected during rebound action.

The piston shell 36 carries on its grooved outer circumference a band type annular seal 64 of graphite filled Teflon or of other suitable antifriction material. The free ends of this seal are joined by the tongue and slot connection 66 shown in FIG. 1.

While the mechanical interlock between the piston and piston rod described above provide high tensile strength to meet all load requirements, jounce loads, which are generally greater than rebound loads are effectively separated to reduce jounce loading through the pistons and rod connection. This is illustrated in FIG. 2 with a first jounce load path P-1 from the bottomed piston extending though annular stop surface 48 into the rod 40. The second and parallel jounce load P-2 leads through the mechanical joint. With this routing the high jounce loads, with foamed urethane jounce bumper 69 collapsed and the piston in the dashed line position of FIG. 1, do not unduly stress the mechanical joint so that service life is increased.

Figure 3:
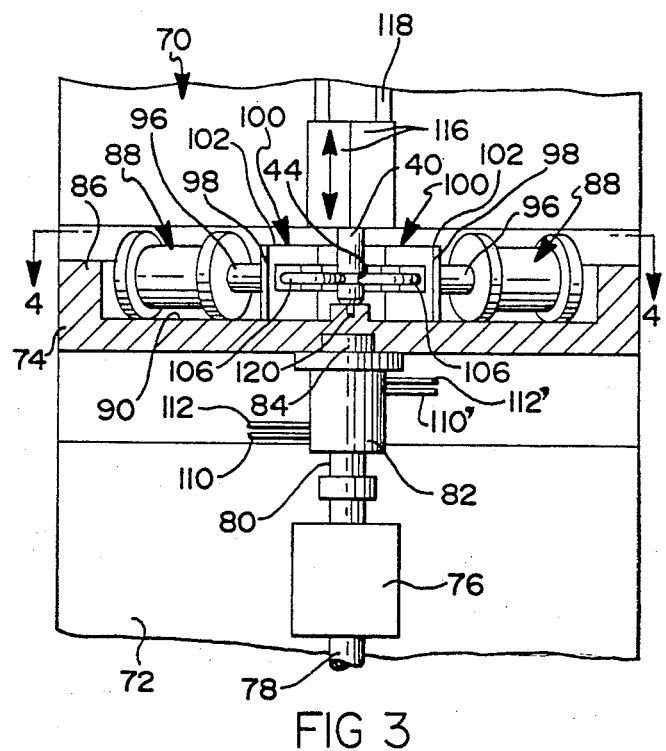
FIG. 3 is a diagrammatic view showing a roll forming machine utilized to make the piston and piston rod connection illustrated in FIG. 2.
Figure 4:
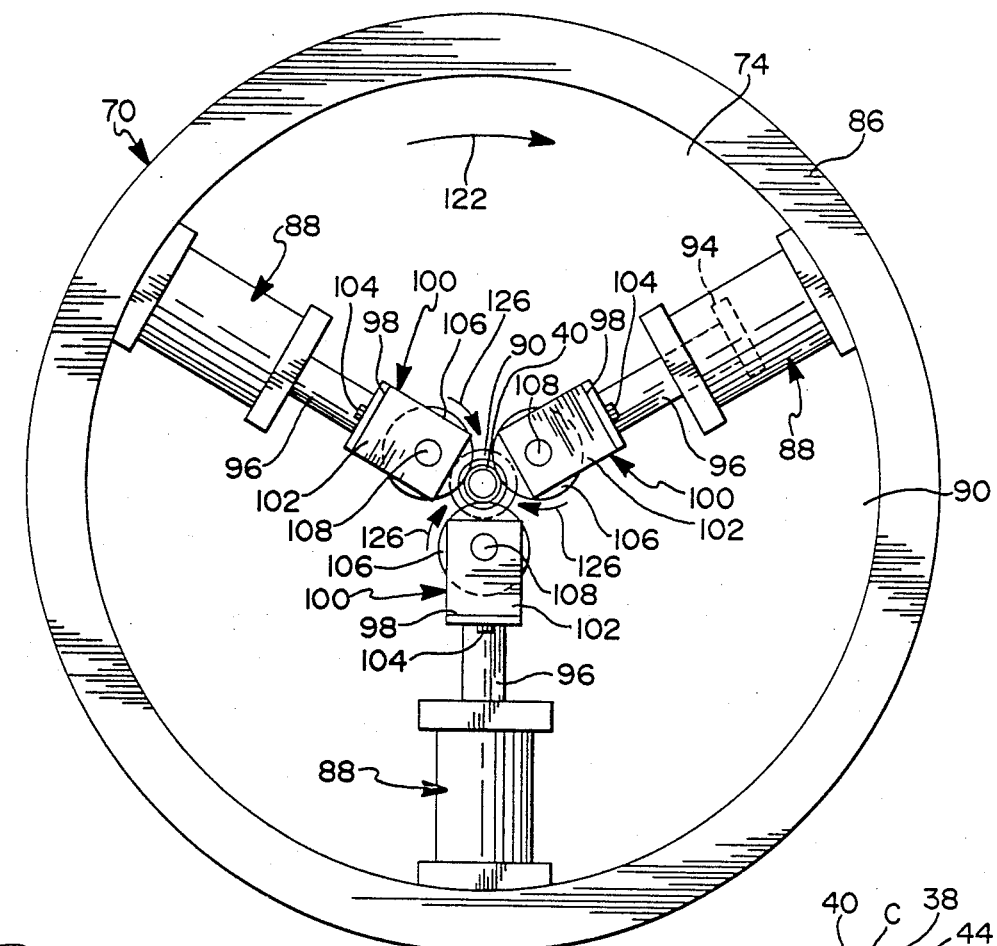
FIG. 4 is a diagrammatic view taken generally along lines 4—4 of FIG. 3 illustrating the roll forming action of the machinery and making the high tensile strength connection of this invention.

The method and machinery to make the high tensile strength interlock of this invention are diagrammatically illustrated in FIG. 3–8. In FIG. 3, the roll forming machine 70 has a base 72 on which face plate 74 is rotatably mounted. The face plate 74 is driven from a drive motor and speed reducer (not shown) into a selectively engageable clutch 76 through an input drive shaft 78. The clutch has an output shaft 80 that drives a rotary hydraulic union 82 which is drivingly connected at 84 to the center of the face plate 74. The face plate 74 is an annular support with a projecting peripheral wall 86. Three identical and radially-oriented and interconnected hydraulic-powered cylinders 88 are attached to the wall 86 and to the outer surface 90 of the face plate 74 equidistant from one another as best shown in FIG. 4.

Each of the equally spaced cylinder 88 incorporates a piston 94 with a piston rod 96 extending radially inwardly therefrom. The end of each piston rod 96 carries a mounting plate 98 to which a form roller assembly 100 is removably attached. Each form roller assembly 100 has a carrier or clevis 102 having a generally U-shaped cross-section with an outer wall releasably attached to the mounting plate of the power piston by a suitable fastener diagrammatically illustrated by a screws 104.

Each of the carriers 102 have inner and outer side walls and spaced to accommodate a form roller 106 rotatably mounted on a pin 108. Hydraulic supply and return lines 110, 112 operatively connecting a hydraulic pump, not shown, to the hydraulic rotary union 82. Supply and return lines 110', 112' hydraulically connecting the union 82 to the power pistons 88 route pressure fluid for cylinder operation in moving the form rollers between a retracted position allowing workpiece loading and unloading and the full line roll formed position illustrated in FIGS. 3 and 4. The workpiece, illustrated by the piston rod 40, is axially moved from a retracted loading and unloading position to a roll forming position shown in FIGS. 3 and 4 by a pair of gripping jaws or clamps 116 which are movable on tracks or ways 118 in the face plate and are powered by a power cylinder. Conventional hydraulic controls not illustrated are employed to control the supply of fluid to and from the cylinders to effect the cylinder operation and roll forming of the piston rod and piston to provide the high strength tensile joints between these components.

Figure 5:
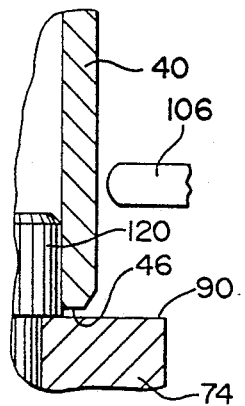
FIGS. 5 and 6 are diagrammatic views illustrating the roll forming action of the machinery and roll forming a groove into the piston rod of the present invention.
Figure 6:
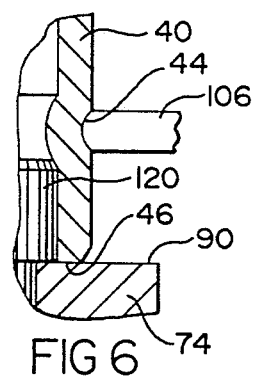

FIG. 3 illustrates the piston rod 40 gripped by the clamps 116 and moved from the loading position to the work or roll forming position onto an optional locator pin 120 projecting from the face plate 74. The radially disposed and equispaced power cylinders are hydraulically actuated to stroke inwardly as shown in diagrammatically in FIG. 5 and then into rolling contact with the cylindrical wall of the piston rod. The face plate is rotated clockwise as indicated by arrow 122 in FIG. 4 by operation of the drive motor and the drive engagement of clutch 76. As the face plate is rotated and the form rollers engage the wall of the clamped and stationary piston rod 40 with equal force under axial pressure from the cylinders 88, the rollers 106 rotate clockwise as shown by arrows 126 to form the uniform annular groove 44 adjacent to the lower end of the piston rod. In addition to being roll formed inwardly, the material of the tubular piston rod is displaced axially to increase the axial length of the rod to the design height. FIGS. 5 and 6 illustrate the lengthening of the piston rod about 1 mm downwardly, for example, so that the lower end 46 engages the face plate 74. After the annular uniform groove 44 has been formed, the grooved piston rod is moved to a retracted position so that the neck 38 of the piston shell 36 with the washer 60 aboard can be telescoped over the end of the rod and pressed inwardly until the tapered stop surface on the end of the rod 40 engages the annular locator surface 48 formed within the shell of the piston. After the piston and piston rod are thus precisely located axially, they are moved as a unit to the roll forming position shown in FIGS. 7 and 8. When in the retracted position, the carriers 102 and their form rollers 106 are removed from the end of the piston rod and replaced with a second set of carriers and form roller 128 generally like those of a first set but having a smaller roller width so that the inner annular ring 54 made by form roller 128 matches the radius of the formed groove 44 on the OD of the piston rod.

Figure 7:
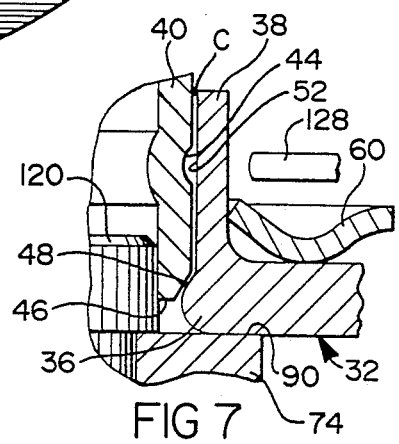
FIGS. 7 and 8 are views similar to FIGS. 5 and 6 illustrating the roll forming of the piston onto the piston rod with the rod acting as a mandrel and the centralized interconnection of these two parts with the high strength tensile joint.
Figure 8:
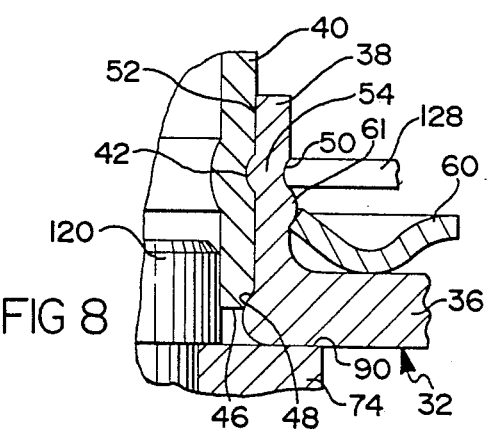

FIG. 7 illustrates the power cylinder being stroked to move the small width form roller 128 toward the neck of the piston and in precise radial alignment with the groove 44 in the piston rod. The face plate is again rotatably driven as described above and the form rollers are moved into equal and opposing pressure engagement with the neck 38 to form the groove 50 in the neck. The material of the neck is worked to form the internal inwardly extending locking ring 54 which is worked into the groove 34 to join these parts with a high tensile strength connection. With the second set of form rollers rotatably deforming the perpendicular cylindrical neck of the piston into the groove of the piston rod, the piston is precisely centered with respect to the rod. This self-centering concentricity and squareness is obtained because both grooves are uniform and made using the same machine.

In the event that the geometric centers of the rod end and the neck of the piston do not precisely coincide before the neck 38 is grooved, this invention will automatically correct small dimensional errors and mechanically displace the neck piston into center to center coincidence with respect to the rod. For example, if there is 0.008 in. total indicator readout in the internal diameters of the piston neck, shown as clearance "C" in FIG. 7, grooving of the piston neck would not commence until all rollers physically engage the outer wall of the piston neck with equal forces. Accordingly, the roller 128 would move radially inward to slightly shift the piston to take up clearance C. At this time, the equalized force of the three rollers 128 effects the groove 50 in the piston neck as described above. With this piston and piston rod alignment the bearing surfaces of the piston sliding in the cylinder tube 18 and the bearing surface of piston rod 40 sliding in the rod guide 43 the same axis so that sliding friction is minimized. With the groove 50 formed in the 38, an annular collar 131 having a diameter slightly greater than that of the piston rod is formed to mechanically trap the washer 60 in the position as illustrated in FIG. 2.

With the high strength tensile joint, there are no residual particles to adversely affect the air suspension damper valving, the rolling air sleeve, bearings, seals or other components within the unit. Furthermore, undercutting, drilling and pining are eliminated. Also there is no heat distortion and misalignment as might occur with other fastener arrangements.

While the high strength tensile joint and method of manufacture has been described in connection with an air suspension damper, it will be appreciated that the method can be effectively utilized to join other tubular parts such as in hydraulic pistons and for struts as well as for other automotive components.

The embodiments of the invention in which an exclusive property or privilege is claimed are defined as follows:

1. A method of manufacturing a modular piston assembly adapted to be stroked in a damper unit from (1) a cylindrical hollow piston rod with a predetermined thickness and with upper and lower ends and (2) a shell like piston having a large diameter cylindrical main body and a hollow small diameter cylindrical neck extending upwardly from a centralized area of the main body comprising the steps of locating a predetermined position on said piston rod from one of said ends and adjacent to the other of said ends, forming an annular retention groove of a predetermined design depth in said piston rod which corresponds to said predetermined position and which elongates said piston rod to a predetermined design length and terminating in an abutment end for engaging an interior surface of said cylindrical main body for maintaining alignment between said piston and said rod, inserting one end of said piston rod within said neck of said piston so that said retention groove is surrounded by said neck, subsequently deforming a groove into said neck concentric with said retention groove in said piston rod so that said inner wall of said neck annularly deforms and enters said retention groove in said piston rod to form a high tensile strength joint and to center and square said main body of said piston with respect to said piston rod for optimized stroking movement of said piston in said damper unit.

2. The method defined in claim 1 wherein said rod is initially held stationary and plurality of form rollers are moved axially from a start position radially inwardly to a work position against said rod at said predetermined position and rotated as said rollers are rotated to form said groove in said piston rod.

3. The method defined in claim 1 wherein said rod is inserted in a close fitting relationship within said neck and is held stationary in a work position and a plurality of equally spaced form rollers are moved radially inwardly in opposition to one another and against said neck to form said groove in said neck and in alignment with the groove in said rod while said rod acts as a mandrel while said joint is formed.

4. A piston assembly for stroking movement in a cylinder comprising a shell-like piston having a cylindrical main body with a predetermined diameter, a cylindrical neck having a diameter less than the diameter of said main body and extending upwardly from a central portion of said main body, a cylindrical piston rod extending into concentric relationship with said neck, said rod and said neck having interfacing cylindrical walls contacting one another, first annular inwardly extending groove means formed in said piston rod adjacent one end thereof and second annular inwardly extending groove means formed in said neck to form an annular tongue in the cylindrical wall thereof which tightly interfits in said first groove means to provide a high tensile strength joint connecting said piston to said rod in a squared and centered relationship and wherein said second groove means forms an external annular retainer groove in said neck, said piston assembly further comprising an elastomeric cylindrical bumper member surrounding said piston rod and having a radially inwardly extending bead-like member to snap fit into said retainer groove to securely interconnect said bumper member to said neck of said piston.

5. The piston assembly of claim 4 and incorporating load spreading washer means trapped between said bumper member and said piston by the interconnection of said bumper member onto said piston neck.

6. A method of manufacturing a modular piston for a damper unit comprising the steps of making an elongated hollow piston rod with a predetermined wall thickness and with upper and lower ends, locating a predetermined position on aid rod from one of said ends and adjacent to one of said ends, forming an annular groove in said piston rod which corresponds to said predetermined position and which deforms and grooves said wall means radially inwardly, inserting said piston rod into an upstanding cylindrical collar of a piston shell means for subsequently, deforming a second groove into said collar concentric with said first groove while said piston rod is held stationary having a cylindrical inner wall, until the lower end of said piston firmly engages a stop shoulder within said collar so that said inner wall of said collar enters and substantially fills said first groove and thereby to said shell.

7. The method defined in claim 6 wherein said rod is held stationary a plurality of form rollers are moved axially from a start position radially inwardly to a work position and rotated as said rollers are rotated to form said groove in said piston rod.

8. The method defined in claim 6 wherein said rod is held stationary in a work position while a plurality of equally spaced form rollers are moved radially inwardly in opposition to one another so that said rod acts as a mandrel.

9. A modular piston assembly for ounce and rebound stroking movement in a cylinder comprising a cylindrical and elongated hollow piston rod, a shell like piston having a main cylindrical body and a centralized cylindrical neck extending perpendicular upwardly therefrom, said rod and said piston being respectively dimensioned to telescopically interfit in close relationship with respect to one another, annular ridge means deformed inwardly in said neck and groove means to rigidly join said piston to said rod with a high tensile strength mechanical joint, and stop surface means engaging an end of said piston rod to provide a force path in parallel to the force path provided by said ridge means and groove means to accommodate jounce loads.

10. The modular piston assembly of claim 9 and further comprising a washer disposed around said neck and said rod, said washer being retained in position by a cylindrical collar formed on said piston rod.

* * * * *